(12) United States Patent
Xu et al.

(10) Patent No.: US 11,951,778 B2
(45) Date of Patent: Apr. 9, 2024

(54) SOUND ABSORBER AND WHEEL HAVING SAME

(71) Applicant: CITIC Dicastal Co., LTD, Qinhuangdao (CN)

(72) Inventors: Shiwen Xu, Qinhuangdao (CN); Mingbo Chen, Qinhuangdao (CN); Minglei Li, Qinhuangdao (CN); Shaobing Huang, Qinhuangdao (CN); Tiefeng Hu, Qinhuangdao (CN); Shuwei Feng, Qinhuangdao (CN); Dadong Wang, Qinhuangdao (CN); Weidong Liu, Qinhuangdao (CN)

(73) Assignee: CITIC Dicastal Co., LTD, Qinhuangdao (CN)

( * ) Notice: Subject to any disclaimer, the term of this patent is extended or adjusted under 35 U.S.C. 154(b) by 825 days.

(21) Appl. No.: 16/746,931

(22) Filed: Jan. 19, 2020

(65) Prior Publication Data
US 2021/0138849 A1  May 13, 2021

(30) Foreign Application Priority Data
Nov. 8, 2019 (CN) .......................... 201911085339.5

(51) Int. Cl.
*B60C 19/00* (2006.01)
*B60B 21/12* (2006.01)

(52) U.S. Cl.
CPC ............ *B60C 19/002* (2013.01); *B60B 21/12* (2013.01); *B60B 2900/133* (2013.01)

(58) Field of Classification Search
CPC ... B60B 21/02; B60B 21/12; B60B 2900/133; B60B 19/00; B60C 19/002; B60C 19/00;
(Continued)

(56) References Cited

U.S. PATENT DOCUMENTS 3,910,374 A * 10/1975 Holehouse ........... G10K 11/172
428/116
5,462,331 A * 10/1995 Stief .................... G10K 11/172
280/847
(Continued)

FOREIGN PATENT DOCUMENTS

CN  101301842 A * 11/2008 .......... B60B 21/023
CN  104908513 A *  9/2015
(Continued)

OTHER PUBLICATIONS

Extended European Search Report for the corresponding EP patent application No. 20154537.3, dated Jul. 3, 2020, 7 pages.

*Primary Examiner* — Edgardo San Martin
(74) *Attorney, Agent, or Firm* — Yong Chen

(57) ABSTRACT

A sound absorber is configured as a rectangular hexahedral box and forms a porous double-layer Helmholtz resonance sound absorbing structure, at the same time, the sound absorber in the form of a box forms a structural resonance sound absorbing device itself, and the first-order natural mode frequency of the device is identical to that of a wheel air chamber. When the box-type sound absorbing structure is assembled in a wheel, double functions of absorbing acoustic resonance of the wheel air chamber under the organic combination of Helmholtz resonance sound absorption and structural resonance sound absorption can be realized.

11 Claims, 2 Drawing Sheets

(58) Field of Classification Search
CPC .... G10K 11/178; G10K 11/172; G10K 11/16; G10K 2210/32272; G10K 2210/3227
See application file for complete search history.

(56) References Cited

U.S. PATENT DOCUMENTS

| | | | | |
|---|---|---|---|---|
| 5,891,278 | A * | 4/1999 | Rivin | B60C 23/004 152/418 |
| 6,516,849 | B2 * | 2/2003 | Flament | B60C 15/0236 152/520 |
| 10,546,070 | B2 * | 1/2020 | Hellat | G06F 30/00 |
| 10,583,697 | B2 * | 3/2020 | Miura | B60C 19/002 |
| 2014/0346843 | A1 | 11/2014 | Kamiyama et al. | |
| 2018/0029425 | A1 * | 2/2018 | Nourzad | B60C 19/002 |
| 2019/0160866 | A1 | 5/2019 | Miura et al. | |
| 2019/0344627 | A1 * | 11/2019 | Saito | B60B 27/0047 |
| 2020/0009922 | A1 * | 1/2020 | Osawa | B60B 21/12 |
| 2020/0130410 | A1 * | 4/2020 | Kamiyama | B60C 19/002 |
| 2020/0160823 | A1 * | 5/2020 | Kamiyama | G10K 11/172 |

FOREIGN PATENT DOCUMENTS

| | | | | |
|---|---|---|---|---|
| CN | 104981359 A | * | 10/2015 | ............. B60B 21/02 |
| CN | 105209267 A | * | 12/2015 | ........... B60B 21/026 |
| CN | 111169221 A | * | 5/2020 | |
| CN | 211764672 U | * | 10/2020 | |
| CN | 212434249 U | * | 1/2021 | ............. G10K 11/16 |
| CN | 112927669 A | * | 6/2021 | ............. G10K 11/16 |
| CN | 213920537 | * | 8/2021 | |
| DE | 19920681 A1 | * | 11/2000 | ............ B60B 21/02 |
| DE | 10220193 A1 | * | 11/2003 | ............ B60C 17/01 |
| DE | 102019208238 A1 | * | 12/2019 | |
| JP | 2000062408 A | * | 2/2000 | ........... B60C 17/041 |
| JP | 2004306714 A | * | 11/2004 | ........... B60C 19/002 |
| JP | 2009214613 A | * | 9/2009 | |
| JP | 2015067051 A | | 4/2015 | |
| JP | 2020090252 A | * | 6/2020 | |
| KR | 102302964 B1 | * | 9/2021 | ........... B60C 19/002 |

* cited by examiner

SOUND ABSORBER AND WHEEL HAVING SAME

CROSS-REFERENCE TO RELATED APPLICATIONS

The present application claims the priority of Chinese patent application No. 201911085339.5, filed on Nov. 8, 2019, which is hereby incorporated by reference in its entirety.

TECHNICAL FIELD

The present disclosure relates to a sound absorber and a wheel having the same, and specifically to an automobile wheel equipped with a pneumatic tire.

BACKGROUND

During the normal driving process, the excitation of a road to a wheel and the excitation of an axle to the wheel caused by imbalance of rotation of the wheel both can excite an air chamber in the wheel to generate acoustic resonance, the resonance is transmitted to the vehicle structure through the axle and a suspension system, and noise is then radiated into the vehicle. The noise mainly has the characteristics of low frequency and narrow band, and has high magnitude, which causes noise interference to the riding environment in the vehicle and needs effective control.

At present, numerous studies and patents provide methods to effectively control such acoustic resonance. The methods mainly adopt the principle of sound absorption control, and Helmholtz resonance sound absorption has been widely applied with good effect. For example, Chinese patents CN101301842B, CN104981359B, CN105209267B, and CN104908513B relate to a series of wheel technical solutions implemented based on Helmholtz resonator noise reduction methods. However, in the solutions known from the prior art, the Helmholtz resonator is relatively complicated in structural design and mounting structure, and is not ideal in terms of sound absorption effect. Particularly, since the states of four wheels are different during driving, there may be multiple narrow-band and high-magnitude noises with different distribution characteristics, and a large magnitude of noise emerges in a wider band, which is contradictory to the advantages of Helmholtz narrow-band sound absorption. Therefore, the structure based on the principle of Helmholtz sound absorption still needs to be continuously developed and improved. At the same time, the structure based on this principle is diverse, and there is room for further improvement on control of amplitude and bandwidth. In addition, the principle of Helmholtz sound absorption is also suitable to combine with other noise reduction principles (such as resonance sound absorption of a box-type structure) to compensate for the deficiencies of the Helmholtz principle, so as to improve the efficiency of controlling the resonance of the air chamber more effectively. However, the combination of multiple noise reduction principles has not been promoted in the reduction of acoustic resonance of wheel air chambers.

SUMMARY

The present disclosure proposes a sound absorber specially constructed based on the principle of a Helmholtz resonator, which is applied to a wheel to reduce noise so as to overcome the above defects in the prior art, and particularly, a more effective noise reduction effect is achieved by the combination of sound absorption of a double-layer porous Helmholtz structure and resonance sound absorption of a box-type structure.

In order to improve the resonance control effect of a wheel air chamber, the present disclosure is mainly based on the following ideas: first, a double-layer porous resonance sound absorbing structure is used to overcome, on the control principle, the defects that single Helmholtz resonance sound absorption is difficult in improving the low-frequency sound absorption capability under a limited volume and narrow in sound absorption band; and second, a rectangular hexahedral box-type structure, preferably made of plastic, is used, and the resonance frequency of the box-type structure is designed to be identical to that of an air chamber, so that the sound absorption amount is further increased on the basis of double-layer porous resonance sound absorption, and the sound absorption band is expanded.

Specifically, the present disclosure provides a sound absorber, the sound absorber is configured as a rectangular hexahedral box and forms a porous double-layer Helmholtz resonance sound absorbing structure, the box has two sides defining boundaries of two ends of the box in the moving direction of the moving component, the inside of the box is divided by a partition into a first cavity and a second cavity successively arranged in the moving direction of the moving component, the partition is parallel to one side of the box, two hollow tubes are mounted on the side, the two hollow tubes respectively have an orifice opened to a wheel air chamber on the side and extend into the first cavity at a distance corresponding to their lengths, a hollow tube is mounted on the partition, the hollow tube has an orifice opened to the first cavity on the partition and extends into the second cavity at a distance corresponding to its length, and the first cavity and the second cavity constitute two layered resonant cavities of the porous double-layer Helmholtz resonance sound absorbing structure.

Here, it is advantageous that the structural parameters of the box are determined by a predetermined sound absorption coefficient and a sound absorption amount of the porous two-layer Helmholtz resonance sound absorbing structure, the structural parameters comprising plate thicknesses of the partition and the side, orifice diameters and lengths of the hollow tubes, and shapes, volumes and wall thicknesses of the first cavity and the second cavity.

It should be noted that the "rectangular hexahedral" described in the present disclosure is not strictly limited to a geometrically precise rectangular shape, but is roughly a similar rectangular hexahedral shape, wherein one or more surfaces are configured to have certain radian and/or have a partial raised or sunken structure, the intersecting surfaces are not absolutely orthogonal, and the opposite surfaces are not absolutely parallel, which does not affect the implementation of the technical solution of the present disclosure.

Accordingly, the present disclosure provides a wheel, the sound absorber is mounted inside a wheel air chamber to reduce acoustic resonance.

One or more sound absorbers can be mounted on a hub of the wheel.

A plurality of sound absorbers can be arranged side by side on the hub of the wheel or a plurality of sound absorbers are arranged along the circumference of the hub.

Here, the sound absorber is mounted in a state that the bottom surface of the box is attached to the rim bottom surface of the hub, and is arranged such that the side mounted with the two hollow tubes is used as an air incident flow side when the wheel rotates.

Preferably, the sound absorber is fixed to the hub of the wheel by a band (for example, a steel band), and therefore is easy to disassemble and replace.

Advantageously, the box of the sound absorber is made of metal or plastic and forms a structural resonance sound absorbing device itself, and the first-order natural mode frequency of the structural resonance sound absorbing device is identical to that of the wheel air chamber.

The sound absorber has double functions of absorbing acoustic resonance of the wheel air chamber under the organic combination of Helmholtz resonance sound absorption and structural resonance sound absorption.

Preferably, the sound absorber is provided with a U-shaped groove on the top surface of the box opposite to the bottom surface of the box, and the band is embedded into the U-shaped groove and wound one circle on the hub to fix the box of the sound absorber.

Preferably, two ends of the band are fastened by buckles, and the fastening force of the band can be adjusted and/or displayed by means of a fastening tool.

Thus, according to the present disclosure, a structure mounted on the hub for reducing the acoustic resonance of the wheel air chamber can be realized. The structure is specifically embodied as a rectangular hexahedral box-type structure, the inside is divided into two cavities by a thin plate, two hollow tubes are mounted on a side (parallel to the thin division plate in the box) of the box-type structure, a hollow tube is mounted on the thin division plate in the box, the plane of one end orifices of the two hollow tubes and the side of the box-type structure are on a surface, the tubes extend into a cavity, the plane of one end orifice of the hollow tube and the thin division plate in the box are on a surface, and the hollow tube extends into the other cavity. The two hollow tubes of the structure are in communication with a tire air chamber, and the structure is mounted on the circular arc surface of the hub to form a porous double-layer Helmholtz resonance sound absorbing structure. Compared with single-cavity single-hole Helmholtz resonance sound absorption, this design is closer to the low frequency and the sound absorption band is wider. The relevant parameters of the structure are determined by a sound absorption coefficient and a sound absorption amount of the double-layer Helmholtz resonance sound absorbing structure.

The box-type structure is preferably made of plastic having certain rigidity and strength, is closely attached to the circular arc surface of the hub, and is fixed by a steel band. In the first-order natural mode frequency of the structure mounted in such a way is identical to that of the wheel air chamber, thus forming a resonance sound absorbing structure.

The natural mode of the structure meets the design requirements by plate thickness and shape adjustment, and the adjustment is implemented by calculation of finite elements. On the one hand, the design can further increase the sound absorption amount of the porous double-layer resonance sound absorbing structure, and can also further increase the sound absorption bandwidth.

The box type sound absorbing structure constituted by porous double-layer resonance sound absorption and structural resonance sound absorption may be designed with a U-shaped groove on the upper surface, and the box-type structure is mounted in such a way that a steel band passes through the U-shaped groove and is wound one circle on the hub for fixing. According to actual needs and specific design conditions, a plurality of box type sound absorbing structures may also be arranged on the hub, and the steel band is wound one circle on the hub to fix the box type sound absorbing structures on the hub together. The steel band joints are fastened with buckles, and the fastening force can be displayed by a fastening tool to judge the mounting firmness.

The beneficial technical effects achieved by the present disclosure particularly lie in that the integrated sound absorbing structure constituted by porous double-layer resonance sound absorption and structural resonance sound absorption realizes more effective sound absorption effects, which is reflected in: 1, the sound absorption frequency is closer to the low frequency; 2, the sound absorption band is wider; and 3, the sound absorption amount is higher.

In which: 1—side of a box, the side being mounted with two hollow tubes, 2—hollow tube, 3—hollow tube, 4—first cavity, 5—partition, 6—hollow tube, 7—second cavity, 8—U-shaped groove; 10—sound absorber, 20—hub, 30—wheel air chamber, 40—tire, 50—band.

DETAILED DESCRIPTION

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

Figure 1:
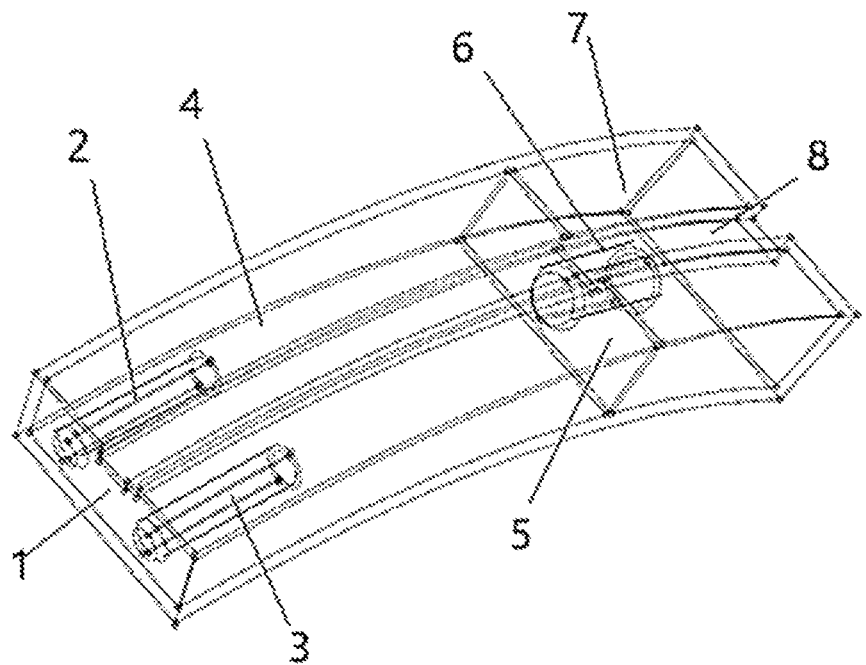
FIG. 1 is a schematic diagram of a sound absorber according to the present disclosure.
Figure 2:
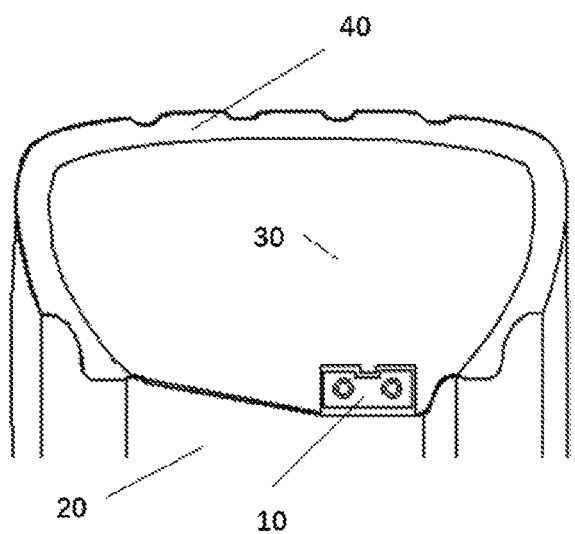
FIG. 2 is a schematic diagram of a mounting position of the sound absorber on a wheel.

The present disclosure provides a sound absorber 10. The sound absorber is mounted on a moving component (as shown in FIG. 2, particularly a hub 20 of an automobile wheel equipped with a pneumatic tire 40) in an air environment (as shown in FIG. 2, particularly a wheel air chamber 30) to reduce acoustic resonance. As shown in FIG. 1, the sound absorber is configured as a rectangular hexahedral box and forms a porous double-layer Helmholtz resonance sound absorbing structure. The box has two sides defining boundaries of two ends of the box in the moving direction of the moving component, the inside of the box is divided by a partition 5 into a first cavity 4 and a second cavity 7 successively arranged in the moving direction of the moving component, the partition is parallel to one side 1 of the box, two hollow tubes 2 and 3 are mounted on the side 1, the two hollow tubes respectively have an orifice opened to the wheel air chamber on the side 1 and extend into the first cavity 4 at a distance corresponding to their lengths, a hollow tube 6 is mounted on the partition 5, the hollow tube has an orifice opened to the first cavity 4 on the partition 5 and extends into the second cavity 7 at a distance corresponding to its length, and the first cavity 4 and the second cavity 7 constitute two layered resonant cavities of the porous double-layer Helmholtz resonance sound absorbing structure. The structural parameters of the box are determined by a predetermined sound absorption coefficient and a sound absorption amount of the porous two-layer Helmholtz resonance sound absorbing structure, the structural parameters including plate thicknesses of the partition 5 and the side 1, orifice diameters and lengths of the hollow tubes, and shapes, volumes and wall thicknesses of the first cavity 4 and the second cavity 7. This will be further described below.

Figure 3:
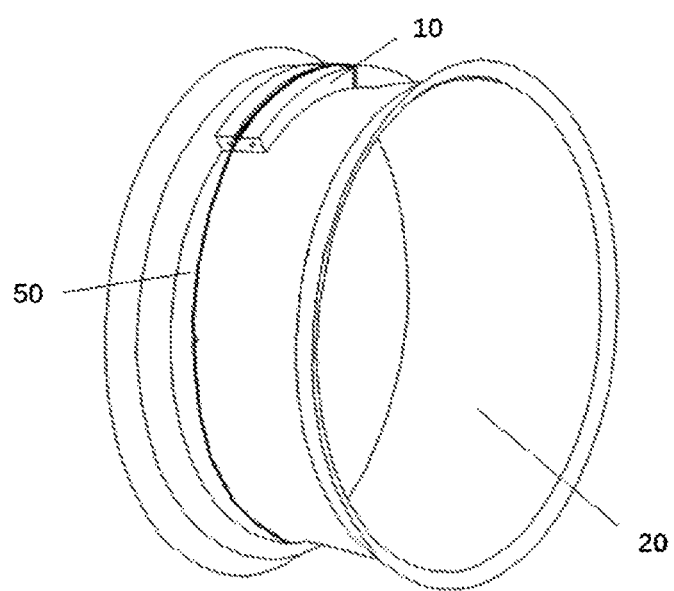
FIG. 3 is a schematic diagram of assembly and fixing of the sound absorber and a hub.

Based on this, the present disclosure also provides a wheel equipped with the sound absorber 10, and the sound absorber is mounted inside the wheel air chamber 30 to reduce acoustic resonance. One or more sound absorbers 10 are mounted on the hub 20 of the wheel. It is possible to arrange a plurality of sound absorbers 10 side by side on the hub 20 of the wheel or arrange a plurality of sound absorbers 10 along the circumference of the hub. As shown in FIG. 2, the sound absorber 10 is mounted in a state that the bottom surface of the box is attached to the rim bottom surface of the hub 20, and is arranged such that the side 1 mounted with the two hollow tubes is used as an air incident flow side when the wheel rotates. As shown in FIG. 3, the sound absorber 10 is fixed to the hub 20 of the wheel by a band 50 (for example, a steel band). It is particularly advantageous that the box of the sound absorber is made of metal or plastic and forms a structural resonance sound absorbing device itself, and the first-order natural mode frequency of the structural resonance sound absorbing device is identical to that of the wheel air chamber 30. As shown in FIG. 2 and FIG. 3, the sound absorber (10) is provided with a U-shaped groove 8 on the top surface of the box opposite to the bottom surface of the box, and the band 50 is embedded into the U-shaped groove and wound one circle on the hub 20 to fix the box of the sound absorber. Two ends of the band 50 are fastened by buckles, and the fastening force of the band can be adjusted and/or displayed by means of a fastening tool.

FIG. 1 shows an embodiment of the sound absorber according to the present disclosure, which is embodied as an injection-molded rectangular hexahedral box-type structure. The inside is divided into two cavities by a thin plate (partition 5), that is, a first cavity 4 and a second cavity 7, two hollow tubes 2 and 3 are mounted on one side 1 (parallel to the thin division plate in the box) of the box-type structure, and a hollow tube 6 is mounted on the thin division plate in the box.

The plane of one end orifices of the two hollow tubes 2 and 3 and the side 1 of the box-type structure are on a surface, the tubes 2 and 3 extend into the first cavity 4, the plane of one end orifice of the hollow tube 6 and the thin division plate (partition 5) in the box are on a surface, and the hollow tube 6 extends into the second cavity 7.

The two hollow tubes 2 and 3 of the box resonance sound absorbing structure shown in FIG. 1 are in communication with the wheel air chamber (or tire air chamber) 3 shown in FIG. 2, and the box resonance sound absorbing structure is mounted on the circular arc surface of the hub 2 shown in FIG. 2 to form a porous double-layer Helmholtz resonance sound absorbing structure.

The relevant parameters of the rectangular hexahedral box-type structure shown in FIG. 1 are determined by the sound absorption coefficient and sound absorption amount of the double-layer Helmholtz resonance sound absorbing structure, as described in the following formulas:

Z is acoustic impedance of the resonance structure. $Z_{p1}$ is acoustic impedance of a hole of a first layer perforated structure, and $Z_{a1}$ is acoustic impedance of a first layer cavity. $Z_{p2}$ is acoustic impedance of a hole of a second layer perforated structure, and $Z_{a2}$ is acoustic impedance of a second layer cavity.

$$Z_{p1} = \frac{\rho}{\delta_1}\sqrt{8\gamma\omega}\left(1 + \frac{t_1}{d_1}\right) +$$
$$j\frac{\omega\rho}{\delta_1}\left[\sqrt{\frac{8\gamma}{\omega}}\left(1 + \frac{t_1}{d_1}\right) + t_1 + 0.85d_1\left(1 - 1.47\sqrt{\delta_1} + 0.47\sqrt{\delta_1^3}\right)\right]$$

$$Z_{p2} = \frac{\rho}{\delta_2}\sqrt{8\gamma\omega}\left(1 + \frac{t_2}{d_2}\right) +$$
$$j\frac{\omega\rho}{\delta_2}\left[\sqrt{\frac{8\gamma}{\omega}}\left(1 + \frac{t_2}{d_2}\right) + t_2 + 0.85d_2\left(1 - 1.47\sqrt{\delta_2} + 0.47\sqrt{\delta_2^3}\right)\right]$$

$$Z_{a1} = -j\rho c \cot\left(\frac{\omega D_1}{c}\right)$$

$$Z_{a2} = -j\rho c \cot\left(\frac{\omega D_2}{c}\right)$$

$$Z = Z_{p1} + \frac{Z_{a1}(Z_{a2} + Z_{p2})}{Z_{a1} + Z_{a2} + Z_{p2}}$$

In the formulas, ρ is air density, c is sound velocity of air, $\omega = 2\pi f$, and f is frequency. γ is an air movement viscosity coefficient, $\gamma = 15 \times 10^{-6}$ m$^2$/s. $t_1$ and $t_2$ are respectively thicknesses of the first layer plate and second layer plate, $d_1$ and $d_2$ are respectively hole diameters of the first layer plate and second layer plate, $\delta_1$ and $\delta_2$ are respectively perforation rates of the first layer plate and second layer plate, and $D_1$ and $D_2$ are respectively thicknesses of the first layer cavity and second layer cavity.

$Z_r$ is relative acoustic impedance of the resonance structure.

$$Z_r = \frac{Z}{\rho c}$$

If R is the real part of $Z_r$ and X is the imaginary part of $Z_r$, the sound absorption coefficient α of the resonance sound absorbing structure is:

$$\alpha = \frac{4R}{(R+1)^2 + (X+1)^2}$$

Calculation formula of sound absorption amount is: A=αs

A is the sound absorption amount of the resonance sound absorbing structure.

S is the sum of cross-sectional areas of the hollow tube 2 and the hollow tube 3 of the resonance sound absorbing structure.

The first-order natural mode frequency of the rectangular hexahedral box-type structure shown in FIG. 1 as a resonance sound absorbing structure is identical to that of the wheel air chamber. The natural frequency meets the design requirements by means of plate thickness and shape adjustment, and the adjustment is implemented by calculation of finite elements.

The upper surface of the porous double-layer resonance sound absorbing structure shown in FIG. 1 is designed with a U-shaped groove 8 for mounting the sound absorbing structure to the hub 1 shown in FIG. 3. As shown in FIG. 2 and FIG. 3, the mounting method is: a steel band as the band 3 passes through and is embedded into the U-shaped groove 8, and is wound one circle on the hub to press the resonance sound absorbing structure against the hub for fixing. Since the steel band is wound one circle on the hub, one or more sound absorbing structures can be fixed on the hub. The steel band joints are fastened with buckles, and the fastening force can be displayed by a fastening tool to judge the mounting firmness.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A sound absorber, being mounted on a moving component in an air environment to reduce acoustic resonance, wherein the sound absorber is configured as a rectangular hexahedral box and forms a porous double-layer Helmholtz resonance sound absorbing structure, the box has two sides including a first side and a second side opposite to the first side, defining boundaries of two ends of the box in the moving direction of the moving component, the inside of the box is divided by a partition into a first cavity and a second cavity successively arranged in the moving direction of the moving component, the partition is parallel to the first side of the box, two hollow tubes are mounted on the first side, each hollow tube mounted on the first side has an orifice opened to a wheel air chamber on the first side and has an elongated structure and extends into the first cavity at a distance corresponding to each length in a direction of the longest axis of the rectangular hexahedral box, a hollow tube is mounted on the partition and has an orifice opened to the first cavity on the partition and has an elongated structure and extends into the second cavity at a distance corresponding to its length in a direction of the longest axis of the rectangular hexahedral box, and the longest axis of each hollow tube mounted on the first side and the partition extends along the longest axis of the rectangular hexahedral box, and the first cavity and the second cavity constitute two layered resonant cavities of the porous double-layer Helmholtz resonance sound absorbing structure;

wherein a plane of the orifice opened to the first cavity of the hollow tube mounted on the partition is on the same surface as the partition in the box;

wherein the orifice of each hollow tube opened to the wheel air chamber on the first side is smaller than the orifice of the hollow tube opened to the first cavity on the partition.

2. The sound absorber according to claim 1, wherein the structural parameters of the box are determined by a predetermined sound absorption coefficient and a sound absorption amount of the porous two-layer Helmholtz resonance sound absorbing structure, the structural parameters comprising plate thicknesses of the partition and the first side, orifice diameters and lengths of the hollow tubes, and shapes, volumes and wall thicknesses of the first cavity and the second cavity.

3. A wheel equipped with the sound absorber according to claim 1, wherein the sound absorber is mounted inside a wheel air chamber to reduce acoustic resonance.

4. The wheel according to claim 3, wherein one or more sound absorbers are mounted on a hub of the wheel.

5. The wheel according to claim 4, wherein the sound absorber is mounted in a state that the bottom surface of the box is attached to the rim bottom surface of the hub, and is arranged such that the first side mounted with the two hollow tubes is used as an air incident flow side when the wheel rotates.

6. The wheel according to claim 5, wherein the sound absorber is fixed to the hub of the wheel by means of a band.

7. The wheel according to claim 6, wherein the box of the sound absorber is made of metal or plastic and forms a structural resonance sound absorbing device itself, and the first-order natural mode frequency of the structural resonance sound absorbing device is identical to that of the wheel air chamber.

8. The wheel according to claim 6, wherein the sound absorber is provided with a U-shaped groove on the top surface of the box opposite to the bottom surface of the box, and the band is embedded into the U-shaped groove and wound one circle on the hub to fix the box of the sound absorber.

9. The wheel according to claim 8, wherein two ends of the band are fastened by buckles, and the fastening force of the band can be adjusted and/or displayed by means of a fastening tool.

10. The wheel according to claim 3, wherein a plurality of sound absorbers are arranged side by side on the hub of the wheel or a plurality of sound absorbers are arranged along the circumference of the hub.

11. A wheel equipped with the sound absorber according to claim 2, wherein the sound absorber is mounted inside a wheel air chamber to reduce acoustic resonance.

* * * * *